March 15, 1960

H. FEIGHOFEN 2,928,698

TWO-RING ROTARY BEARING

Filed Oct. 19, 1954

INVENTOR.
Hans Feighofen
BY Barthel + Bugbee
Attys

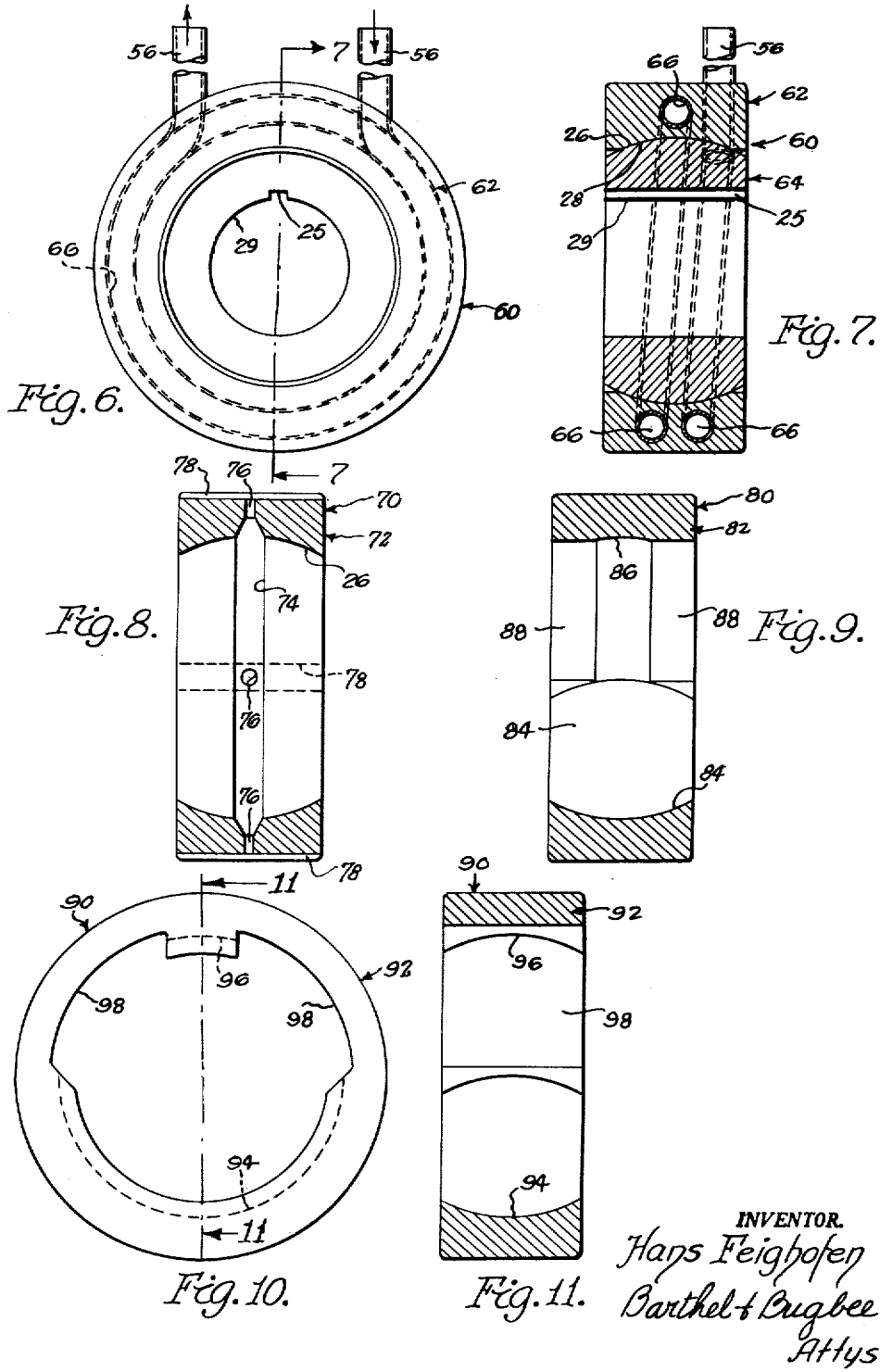

United States Patent Office 2,928,698
Patented Mar. 15, 1960

2,928,698
TWO-RING ROTARY BEARING

Hans Feighofen, Neheim-Husten, Germany

Application October 19, 1954, Serial No. 463,290

2 Claims. (Cl. 308—72)

This invention relates to bearings and, in particular, to two-ring rotary bearings.

One object of this invention is to provide a two-ring rotary bearing having one-piece inner and outer rings engaging one another on matching spherical surfaces, one ring rotating relatively to the other for load-carrying purposes.

Another object is to provide a two-ring rotary bearing of the foregoing character and process of making the same wherein the inner ring is provided with a precision spherical surface on its periphery and the outer ring is cast or mechanically pressed from bearing metal around the inner ring to impart a corresponding spherical surface thereto, a removable layer of clearance-forming material such as lamp black or graphite being applied beforehand to the spherical outer surface of the inner ring and subsequently washed out or otherwise removed in order to provide the necessary working clearance between the outer and inner spherical surfaces.

Another object is to provide a two-ring rotary bearing and process of making the same according to the object immediately preceding, wherein the inner portion of the outer ring is mechanically pressed into conformity with the spherical surface of the inner ring, the metal of the outer ring being caused to flow by the use of opposed ridged dies engaging the opposite plane faces of the outer ring.

Another object is to provide a two-ring rotary bearing of the foregoing character and process of making the same wherein the outer ring is provided with interrupted or separated bearing surfaces engaging the continuous spherical surface of the periphery of the inner ring.

Another object is to provide a two-ring rotary bearing of the foregoing character wherein improved means is provided for supplying lubricant to the inter-engaging spherical surfaces of the outer and inner rings, and of insuring the continued presence of a lubricant film therebetween.

Another object is to provide a two-ring rotary bearing of the foregoing character wherein one of the rings is provided with a channel or passageway through which a cooling fluid is circulated for the purpose of carrying away the heat of friction generated during the operation of the bearing.

Other objects and advantages of the invention will become apparent during the course of the following description of the accompanying drawings, wherein:

Figure 6 is a side elevation of the bearing of Figure 1, additionally provided with a helical cooling fluid pipe or passageway in the outer ring thereof;

Figure 7 is a central vertical cross section taken along the line 7—7 in Figure 6;

Figure 8 is a cross-section of a further modification of Figure 1, wherein the outer ring is provided with lubricant interception and distribution channels;

Figure 9 is a central vertical section through a still further modification of Figure 1, wherein the outer ring is provided with bearing surfaces of different widths engageable with a continuous spherical surface on the periphery of the inner ring;

Figure 10 is a side elevation of another modification of Figure 1 wherein the outer ring is provided with circumferentially-spaced bearing surfaces engageable with a continuous spherical surface on the periphery of the inner ring; and Figure 11 is a central vertical section taken along the line 11—11 in Figure 10.

Figure 1:
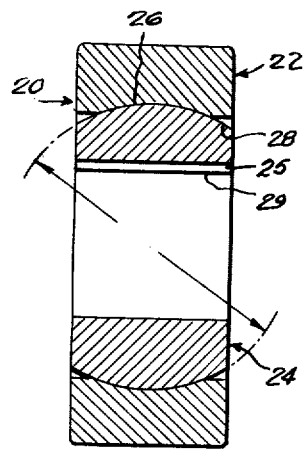
Figure 1 is a cross-section through a two-ring rotary bearing according to one form of the invention wherein the outer ring is of bearing metal cast around the spherical inner ring.

Hitherto, two-ring rotary bearings for rotatably supporting a shaft in a housing have been composed of outer and inner rings with interengaging cylindrical surfaces with a cylindrical bearing bore in the inner ring for receiving the shaft. Hitherto provided also were two-ring self-aligning bearings wherein the inner and outer rings were assembled by making the outer ring in separated components or halves bolted or otherwise held in assembly, or wherein the outer ring was provided with a partly spherical and partly cylindrical bore in which the cylindrical portion was provided with a thin wall for assembly purposes, the thin-walled cylindrical portion being deformed by the application of mechanically pressing it into engagement with the remaining half of the spherical inner ring surface. Also hitherto provided were two-ring self-aligning bearings wherein the outer race was also provided with a partly spherical portion with an opening in the side thereof for the insertion of the spherical periphery of the inner ring, after which bearing metal was flowed into this opening in order to close up the opening and complete the other half of the spherical portion of the outer race.

Also hitherto provided were self-aligning bearings wherein the outer ring was provided with cutout openings lying diametrically opposite one another and corresponding in extent to the width of the inner ring in such a manner that the inner ring is inserted through the cutout portions of the outer ring and then turned approximately one-quarter turn in order to prevent separation of the outer and inner rings from one another. On such prior two-ring self-aligning bearings, the inner ring was provided with a cylindrical bore which rotatably supported the shaft, the interengaging spherical surfaces being used only for rocking self-aligning motion relatively to one another, not for rotation relatively to one another.

These prior two-ring self-aligning bearings of the various types mentioned above have been unsatisfactory for various reasons. Their manufacture has required a considerable amount of machining which in turn has led to excessively high manufacturing costs; separate components bolted or otherwise secured together are liable to come apart accidentally or to dissipate frictional heat poorly; outer rings deformed around the inner ring after assembly have led to insufficiently accurate spherical surfaces in the outer ring; bearings wherein the opening in the outer race is filled in with bearing metal instead of being closed by deformation raise additional problems of different heat expansion of the different metals; and undesirable structural changes resulting from the deformation of the outer ring. Prior bearings made with cutout portions in the outer and inner rings for assembling the rings by inserting the inner ring through the cutout portions of the outer ring and then turning the rings relatively to one another have also interrupted the bearing surfaces to such an extent as to reduce the carrying capacity of the bearing and introduce lubrication difficulties because of the separation of the bearing surfaces.

The present invention provides a two-ring rotary bearing having one-piece outer and inner rings with spherical bearing surfaces which rotate relatively to one another to carry the bearing load, the inner race being keyed or otherwise drivingly secured to the shaft which it supports. The outer ring is preferably formed of bearing metal which is either cast when molten (Figure 1) or mechanically forced to flow when cold by pressing its inner portion (Figure 2) around a previously prepared inner ring of harder, stronger metal provided with a precision spherical peripheral bearing surface. One modification (Figure 9) provides a narrower bearing surface on the non-loaded side of the outer ring, whereas another modification (Figures 10 and 11) of the outer ring provides a spacing or interruption of the spherical bearing surfaces of the loaded and non-loaded sides of the outer ring. Improved cooling of the bearing is provided by an annular (Figure 5) or helical (Figures 6 and 7) cooling channel or pipe either formed in or cast in the outer ring for the circulation of a cooling fluid which carries away the heat of friction developed during the operation of the bearing. Improved lubrication of the bearing is provided by means of an arcuate channel or tube (Figures 3 and 4) which by means of suction created during operation draws lubricant upward from a lubricant sump to the unloaded zone of the bearing from whence it is discharged onto the spherical surface of the inner ring to lubricate the load-carrying zone of the bearing. A further modified outer ring (Figure 8) provides lubricant interception and distribution channels or grooves for further improvement of lubrication.

Referring to the drawings in detail, Figure 1 shows a two-ring rotary bearing, generally designated 20, with one-piece outer and inner rings 22 and 24 having outer and inner spherical bearing surfaces 26 and 28 respectively separated from one another by the desired annular bearing clearance space. This space is of the order of only a few thousandths of an inch or a few hundredths of a millimeter, hence is too small to be shown in the drawings. The inner ring 24 is provided with a cylindrical bore 29 for receiving the shaft (not shown). If, as is preferred, the spherical interengaging surfaces 26 and 28 serve for rotational load-carrying purposes, the inner ring 24 is keyed as at 25 or otherwise drivingly connected to the shaft. The inner ring 24 is preferably made of steel of higher melting point than the outer ring 22, which is preferably made of bearing metal, such as so-called Babbitt metal, which is of lower melting point and of greater ductility than steel.

In the process of making the bearing of Figure 1, the inner ring 24 is first prepared from steel or other suitable material, as stated above, and with its bore 29 and spherical peripheral bearing surface 28 fully formed, the latter being preferably highly polished and of suitable precision of curvature and configuration. The spherical bearing surface 28 is then coated with a layer (not shown) of suitable removable clearance-establishing material, such as lamp black or graphite, this layer having a thickness corresponding to the desired clearance between the outer and inner rings 22 and 24. The inner ring 24, thus coated, is then placed in the center of a suitable mold shaped to the form desired for the outer ring 22, and molten bearing metal poured around it. The assembly is then permitted to cool, after which the layer of removable material is removed by washing or other treatment, leaving the outer and inner rings 22 and 24 interconnected with one another with the desired clearance between their respective spherical surfaces 26 and 28 as determined by the layer of removable material which has been removed. In the making of the bearing of Figure 1, the casting temperature, the coefficient of expansion of the selected material, and the particular casting method, whether by centrifugal flow, pressure flow, descending flow or ascending flow, are chosen according to the considerations discussed above in connection with the construction of the bearing 20, or known to those skilled in the foundry art.

Figure 2:
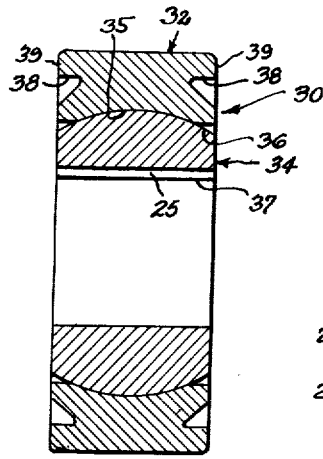
Figure 2 is a cross-section of a modification of the bearing of Figure 1, wherein the inner portion of the outer ring is of bearing metal pressed around the spherical inner ring by mechanical deforming the outer ring to fit the inner ring.

The two-ring bearing, generally designated 30, shown in Figure 2 is generally similar to that shown in Figure 1 and a similar result is obtained. In Figure 2, however, the outer ring, generally designated 32, which is also made of bearing metal, is first formed with a bore (not shown) large enough to admit the inner ring 34 along the maximum diameter of its outer spherical surface 36. The inner ring 34 also has been provided with a shaft-receiving central bore 37 similar to the bore 29 of the inner ring 24 and also with a similar outer spherical surface 36. With the outer and inner rings 32 and 34 thus temporarily assembled, their assembly is made permanent by placing them in a suitable press having a pair of relatively movable opposing dies with projecting annular ridges corresponding to the grooves 38 in the opposite faces 39 of the outer ring 32. When the two dies are moved toward one another, they indent the opposite faces of the outer ring 32 to form the grooves 38 therein, by causing the bearing metal of the inner portion of the outer ring 32 to flow into engagement with the peripheral spherical surface 36 of the inner ring 34, the latter having been previously coated with a clearance layer of coating material, such as the lamp black or graphite previously mentioned.

In thus uniting the outer and inner rings of the bearing 30, the opposing dies are preferably provided with projecting ridges of wedge-shaped cross-section to deform the bearing metal most efficiently, so as to impart the inner spherical surface 35 to the outer ring 32. The inner spherical surface 35 is of slightly shorter radius of curvature than the radius of curvature of the outer spherical surface 36, the latter being increased by the thickness of the clearance layer of material. The cold flow of the bearing metal of the outer ring 32 under the high static pressure exerted thereon produces a two-ring bearing which has excellent running characteristics and high carrying capacity. As in the two-ring bearing 20 of Figure 1, the spherical bearing surfaces 35 and 36 of the two-ring bearing 30 serve as rotary running or load-carrying surfaces, so that the inner ring 34 is also keyed or otherwise drivingly secured to the shaft (not shown) on which it is mounted. In operation, the bearing 30 is caused to dip into the lubricant of a lubricant sump as in Figure 3, whereupon the relative rotation between the bearing rings 32 and 34 causes oil or other lubricant supplied to the outer faces 39 thereof, to travel inwardly toward the central or median plane of the bearing corresponding to the plane of maximum diameter of the inner ring spherical surface 36. This relative rotation provides an action which constantly maintains the bearing surfaces 35 and 36 in a fully lubricated condition without the need for scoop devices under ordinary conditions, such as where the inner ring dips several millimeters below the level L of the lubricant sump S (Figure 3).

Figure 3:
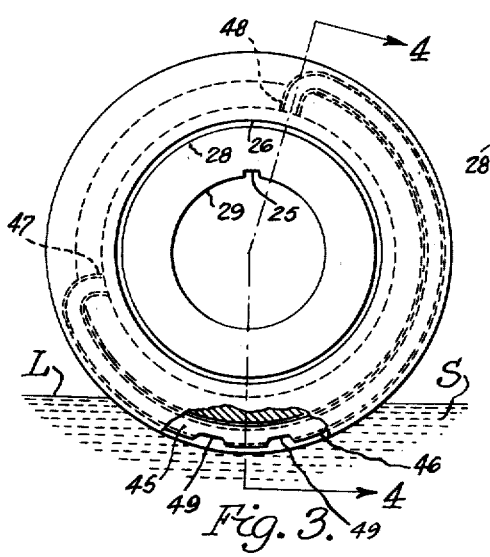
Figure 3 is a side elevation, partly in section, of the bearing of Figure 1, provided with a lubricant supply tube or channel.
Figure 4:
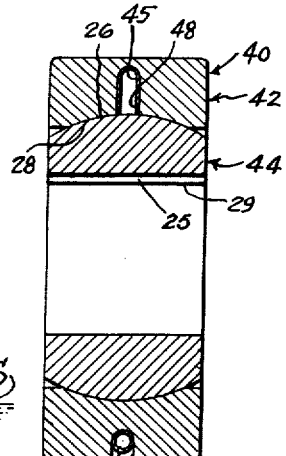
Figure 4 is a substantially vertical cross-section taken along the line 4—4 in Figure 3.

The modified two-ring bearing, generally designated 40, shown in Figures 3 and 4 is generally similar in construction, as regards the outer and inner rings 42 and 44, to the outer and inner rings 22 and 24 of the two-ring bearing 20 of Figure 1, hence corresponding parts are designated with similar reference numerals. In the two-ring bearing 40 of Figures 3 and 4, however, a special lubricating tube or channel 45 is cast or otherwise formed in the outer ring 42, which is also made of bearing metal. The tube 45, when so installed, lies within a peripheral groove 46 in the outer ring 42 (Figure 4). The lubricating tube 45 is preferably of slightly greater than semi-circular extent, with inwardly bent mouths or outlet openings 47 and 48 discharging into the clearance space between the opposing spherical surfaces 26 and 28 in the non-loaded upper portion or zone of the bearing 40. The lubricating tube 45 is provided with inlet openings 49 located at its lowermost portion within a lubricant bath or sump S below the level L of the surface thereof. The modified two-ring bearing 40 thus insures a sufficient supply of lubricant under all conditions, and especially at high speeds and at very deep oil levels.

In the operation of the two-ring bearing 40, the inner ring 44 moves more or less rapidly past the mouths or outlets 47 and 48 of the lubricating tube 45, causing a partial vacuum to be created therein, so that the lubricant is drawn by suction upward through the inlet openings 49 from the lubricant sump S and discharged into the upper or non-loaded zone of the bearing 40, from whence it passes downward into the lower or loaded zone of the bearing 40. At very high running speeds, the unsymmetrical arrangement of the mouths or outlets 47 and 48 of the lubricating tube 45 becomes advantageous.

In the operation of the two-ring bearing 40, the inner ring 44 moves more or less rapidly past the mouths or outlets 47 and 48 of the lubricating tube 45, causing a partial vacuum to be created therein, so that the lubricant is drawn by suction upward through the inlet openings 49 from the lubricant sump S and discharged into the upper or non-loaded zone of the bearing 40, from whence it passes downward into the lower or loaded zone of the bearing 40. At very high running speeds, the unsymmetrical arrangement of the mouths or outlets 47 and 48 of the lubricating tube 45 becomes advantageous.

Figure 5:
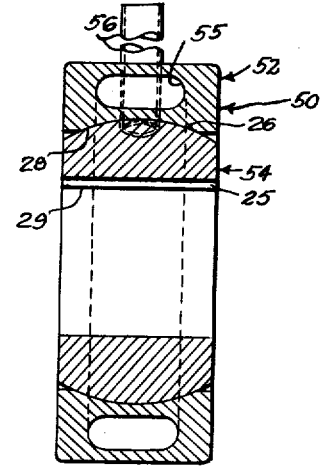
Figure 5 is a vertical cross-section through the bearing of Figure 1, additionally provided with a cooling fluid channel in the outer ring.

The further modified two-ring bearing, generally designated 50, of Figure 5 also has similar outer and inner rings 52 and 54 to the outer and inner rings 22 and 24 of the two-ring bearing 20 of Figure 1, the outer ring 52 is also made of bearing metal, and the parts are similarly formed. Accordingly, the corresponding parts are designated by the same reference numerals as in Figure 1. The outer ring 52 of Figure 5, however, is provided with an annular cooling duct or passageway 55 to which are connected spaced inlet and outlet tubes or pipes 56 leading to cooling fluid supply and discharge reservoirs or sources. By circulating water or other cooling fluid through the passageway 55, the frictional heat developed during operation of the bearing 50 is effectively carried away. In side elevation the bearing 50 of Figure 5 closely resembles that shown in Figure 6.

The still further modified two-ring bearing, generally designated 60, of Figures 6 and 7 is an extension of the cooling arrangement of the bearing 50 of Figure 5 from which it differs by providing a helical cooling fluid passageway or pipe 66 within the outer ring 62, the inner ring 64 being similar to the inner ring 24 of Figure 1. The outer ring 62 is also made of bearing metal and is generally of similar construction to the outer ring 22 of Figure 1, except that the coil of tubing 66 is cast into the outer ring 62 in a manner analogous to the casting of the lubricating tube 45 into the outer ring 42 of the bearing 40 of Figures 3 and 4. The bearing 60 of Figures 6 and 7 like the bearing 50 of Figure 5 has similar cooling fluid inlet and outlet pipes 56, only one of which is shown in Figure 5. The operation of the two-ring bearing 60 of Figures 6 and 7 is similar to that described above in connection with Figure 5 in that a cooling fluid, such as water, is circulated through the tubular cooling coil 66 and carries away the heat of friction arising while the bearing 60 is operating.

The further modified two-ring bearing, generally designated 70, of which only the outer ring 72 is shown in Figure 8, has an improved lubricating arrangement and is used with an inner ring similar to the inner ring 24 of Figure 1. The outer ring 72 is also made of bearing metal and cast around its inner ring in the same manner as the outer ring 22 around the inner ring 24 of Figure 1. The outer ring 70, in addition to having the usual spherical surface 26 created by the casting operation as described above in connection with Figure 1, also has a central annular oil groove 74 into which oil holes 76 open from transverse peripheral oil grooves 78 on the outside of the outer ring 72. In the operation of the bearing 70, assuming the outer ring 72 to be equipped with an inner ring 24 in the manner described above and immersed in a lubricant sump as shown in Figure 3, lubricant is drawn into the clearance space between the outer and inner rings, in the manner described in connection with Figure 1, and is intercepted by the central annular lubricant groove 74. From the groove 74, the lubricant, such as oil, returns to the sump through the holes 76 and transverse grooves 78, thereby forming a lubricating circuit and also cooling the lubricant.

The modified two-ring bearing, generally designated 80, only the outer ring 82 of which is shown in Figure 9, is equipped with an inner ring similar to the inner ring 24 of Figure 1, around which it is similarly cast. The outer ring 82 is made of bearing metal and has an approximately semi-annular or semicircular concave spherical load-carrying bearing surface 84 of full width extending approximately halfway around its interior in the loaded lower zone of the bearing, and a solely centrally-disposed narrow concave spherical abutment bearing surface 86 on the upper or non-loaded zone of the bearing, the portions 88 between the non-loaded surface 86 and the opposite faces of the ring 82 being cut away as at 88. The narrow arcuate abutment bearing surface 86 during rotation of the inner ring, prevents oscillation and consequent vibration of the inner ring in a direction opposite the principal loading direction. Such oscillations result from weight distribution errors or vibrations of the machine to which the shaft is connected or of which it forms a part.

The modified two-ring bearing, generally designated 90, the outer ring 92 of which is made of bearing metal and is shown in Figures 10 and 11, is also equipped with an inner ring (not shown) similar to the inner ring 24 of Figure 1, around which it is similarly cast. The outer ring 92, however, is provided with a full-width spherical load-carrying bearing surface 94 extending around the lower half or loaded zone of the bearing 90 and has a short arcuate spherical abutment bearing surface 96 on the upper or non-loaded side of the bearing. The loaded and non-loaded bearing surfaces 94 and 96 are separated from one another by cutaway portions 98. This construction, like that of Figure 9, also prevents oscillation of the inner ring in a direction opposite the principal loading direction, resulting from weight distribution errors or vibrations of the machine to which the shaft is connected or of which it forms a part.

What I claim is:

1. A two-ring rotary bearing for rotatably supporting a conventional rotary shaft comprising a one-piece inner ring having a convex spherical peripheral bearing surface, a one-piece outer ring of bearing metal encircling said inner ring and having a concave spherical peripheral bearing surface engageable with said inner ring bearing surface, and means for mounting the conventional rotatable shaft in and drivingly connecting the same to said inner ring for rotation of said inner ring relatively to said outer ring in response to rotation of the shaft, said concave spherical surface of said outer ring having a load-carrying bearing portion of relatively broad axial width extending in a circumferential direction approximately halfway around the inner periphery of said outer ring and a solely centrally-disposed abutment bearing portion of relatively narrow axial width disposed approximately diametrically opposite said load-carrying portion and extending in a circumferential direction approximately halfway around the remainder of the inner periphery of said outer ring.

2. A two-ring rotary bearing for rotatably supporting a conventional rotary shaft comprising a one-piece inner ring having a convex spherical peripheral bearing surface, a one-piece outer ring of bearing metal encircling said inner ring and having a concave spherical peripheral bearing surface engageable with said inner ring bearing surface, and means for mounting the conventional rotatable shaft in and drivingly connecting the same to said inner ring for rotation of said inner ring relatively to said outer ring in response to rotation of the shaft, said concave spherical surface of said outer ring having a load-carrying bearing portion of relatively broad axial width extending in a circumferential direction approximately halfway around the inner periphery of said outer ring and a substantially centrally-disposed abutment bearing portion of relatively narrow axial width disposed approximately diametrically opposite said load-carrying portion, said abutment bearing portion extending in a circumferential direction approximately halfway around the remainder of the inner periphery of said outer ring with its opposite ends substantially extending to the opposite ends of said load-carrying bearing portion.

References Cited in the file of this patent

UNITED STATES PATENTS

| | | |
|---|---|---|
| 48,217 | Shriver | June 13, 1865 |
| 312,822 | Dame | Feb. 24, 1885 |
| 1,175,288 | Patrick | Mar. 14, 1916 |
| 1,300,023 | Riegel | Apr. 8, 1919 |
| 1,720,139 | Niven | July 9, 1929 |
| 1,755,570 | Thomson | Apr. 22, 1930 |
| 2,239,834 | Williams | Apr. 29, 1941 |
| 2,352,206 | Kendall | June 27, 1941 |
| 2,366,668 | Heim | Jan. 2, 1945 |
| 2,423,684 | Collito | July 8, 1947 |
| 2,462,138 | Spangenberg | Feb. 22, 1949 |
| 2,464,492 | Dimick | Mar. 15, 1949 |
| 2,729,179 | Attwood | Jan. 3, 1956 |

FOREIGN PATENTS

| | | |
|---|---|---|
| 511,760 | Germany | Nov. 3, 1930 |
| 556,052 | Germany | Aug. 2, 1932 |
| 815,872 | Germany | Oct. 4, 1951 |